(12) United States Patent
Joye

(10) Patent No.: US 8,744,072 B2
(45) Date of Patent: Jun. 3, 2014

(54) EXPONENTIATION METHOD RESISTANT AGAINST SIDE-CHANNEL AND SAFE-ERROR ATTACKS

(75) Inventor: Marc Joye, Cesson-Sevigne (FR)

(73) Assignee: Thomson Licensing, Issy-les-Moulineaux (FR)

( * ) Notice: Subject to any disclaimer, the term of this patent is extended or adjusted under 35 U.S.C. 154(b) by 341 days.

(21) Appl. No.: 13/138,584

(22) PCT Filed: Mar. 1, 2010

(86) PCT No.: PCT/EP2010/052565
§ 371 (c)(1),
(2), (4) Date: Sep. 8, 2011

(87) PCT Pub. No.: WO2010/105900
PCT Pub. Date: Sep. 23, 2010

(65) Prior Publication Data
US 2012/0039461 A1 Feb. 16, 2012

(30) Foreign Application Priority Data

Mar. 16, 2009 (EP) ..................................... 09305238

(51) Int. Cl.
*H04K 1/00* (2006.01)
*H04L 9/00* (2006.01)
*H04L 9/28* (2006.01)
*H04L 9/30* (2006.01)
*G06F 7/72* (2006.01)
*G06F 7/38* (2006.01)

(52) U.S. Cl.
CPC ................ *H04L 9/002* (2013.01); *H04L 9/003* (2013.01); *H04L 9/004* (2013.01); *H04L 9/3066* (2013.01); *G06F 7/72* (2013.01); *G06F 7/723* (2013.01); *G06F 7/724* (2013.01); *G06F 7/728* (2013.01); *G06F 7/38* (2013.01)
USPC ..................... 380/28; 380/44; 380/45; 380/46

(58) Field of Classification Search
CPC ........... H04L 9/00; H04L 9/002–9/004; H04L 9/3066; G06F 7/72; G06F 7/723–7/724; G06F 7/728; G06F 7/38
USPC .......................................... 380/28–30, 44–46
See application file for complete search history.

(56) References Cited

U.S. PATENT DOCUMENTS 5,999,627 A * 12/1999 Lee et al. .......................... 380/30
7,191,333 B1 * 3/2007 Maddury et al. ............... 713/174

(Continued)

OTHER PUBLICATIONS

Benoît Chevallier-Mames, Mathieu Ciet, and Marc Joye, "Low-Cost Solutions for Preventing Simple Side-Channel Analysis: Side-Channel Atomicity", IEEE Transactions on Computers, vol. 53, No. 6, Jun. 2004.*

(Continued)

*Primary Examiner* — Jeffrey Pwu
*Assistant Examiner* — Jayesh Jhaveri
(74) *Attorney, Agent, or Firm* — Myers Wolin LLC

(57) ABSTRACT

An exponentiation method resistant against side-channel attacks and safe-error attacks. Input to the method is g in a multiplicatively written group G and a $l$-digit exponent d with a radix m>1 and output is $z=g^{d-1} \cdot (d-1)$ is expressed as a series of $(l-1)$ non-zero digits, $d^*_0 \ldots d^*_{l-2}$, in the set $\{m-1, \ldots, 2m-2\}$ and an extra digit $d^*_{l-1}$ that is equal to $d_{l-1}-1$, where $d_{l-1}$ represents the most significant radix-m digit of d, and $g^{d-1}$ is evaluated through a m-ary exponentiation algorithm on input g and (d−1) represented by $d^*_0 \ldots d^*_{l-1}$. Also provided are an apparatus and a computer program product.

10 Claims, 1 Drawing Sheet

(56) References Cited

U.S. PATENT DOCUMENTS

| | | | |
|---|---|---|---|
| 7,313,697 B2* | 12/2007 | Meyer et al. | 713/168 |
| 7,779,259 B2* | 8/2010 | Vanstone et al. | 713/169 |
| 8,139,763 B2* | 3/2012 | Boscher et al. | 380/28 |
| 2008/0162940 A1* | 7/2008 | Vanstone et al. | 713/180 |
| 2009/0268900 A1* | 10/2009 | Lambert | 380/28 |
| 2009/0323933 A1* | 12/2009 | Longa et al. | 380/30 |
| 2011/0216899 A1* | 9/2011 | Nogami et al. | 380/28 |
| 2012/0057695 A1* | 3/2012 | Lazich et al. | 380/28 |

OTHER PUBLICATIONS

Menezes etal "14.6 Exponentiation"; "Handbook of Applied Crypotography", 1997, CRC Press, pp. 613-629.

Kim etal "SPA Countermeasure Based on Unsigned Left-to-Right Recording" Autonomic and Trusted Computing, Jul. 11, 2007, pp. 286-295.

Bodo Moller, "Parallelizable Elliptic Curve Point Multiplication Method with Resistance against Side-Channel Attacks", Sep. 30, 2002;pp. 402-413.

K. Okeya etal "Security Analysis of the SPA-Resistant Fractional Width Method", IEICE Transactions . . . ; vol. E89A, No. 1, Jan. 1, 2006,pp. 161-168.

B. Moller: "Securing Elliptic Curve Point Multiplication Against Side-Channel Attacks", Information Security Conference,2001, pp. 324-334.

K. Okeye etal: "The Width-W NAF Method Provides Small Memory and Fast Elliptic Scalar Multiplications Secure Against Side Channel Attacks",Apr. 13, 2003;pp. 328-343.

Search Report Dated Apr. 4, 2010.

* cited by examiner

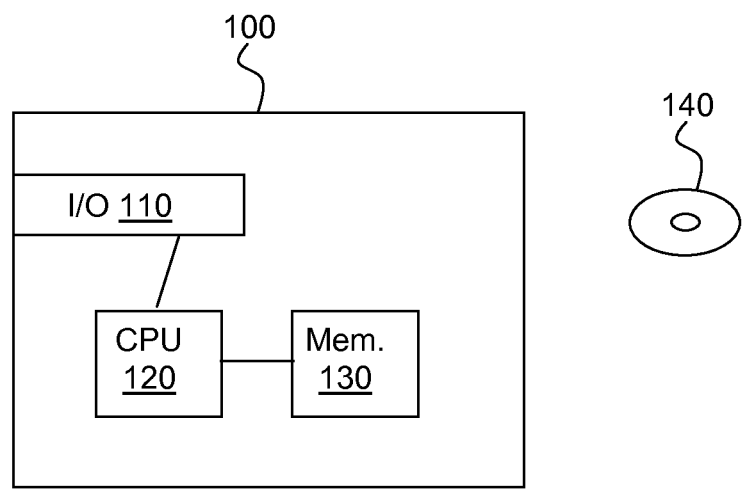

EXPONENTIATION METHOD RESISTANT AGAINST SIDE-CHANNEL AND SAFE-ERROR ATTACKS

This application claims the benefit, under 35 U.S.C. §365 of International Application PCT/EP2010/052565, filed Mar. 1, 2010, which was published in accordance with PCT Article 21(2) on Sep. 23, 2010 in English and which claims the benefit of European patent application No. 09305238.9, filed on Mar. 16, 2009.

TECHNICAL FIELD

The present invention relates generally to cryptography, and in particular to attack-resistant exponentiation methods.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Exponentiation may be expressed as the general problem of evaluating $y=g^d$ in a (multiplicatively written) group G, where $g \in G$ and $d \in Z_{>0}$. The neutral element in G is denoted $1_G$. The m-ary expansion of d is given by $$d = \sum_{i=0}^{I-1} d_i m^i,$$

with $0 \le d_i \le m$ and $d_{I-1} \ne 0$. Integer $I=I(m)$ represents the number of digits (in radix m) for the m-ary representation of d and is called the m-ary length of d.

Left-to-Right Algorithms

The most widely used exponentiation algorithm is the binary method (also known as the "square-and-multiply" algorithm). It relies on the simple observation that $g^d=(g^{d/2})^2$ if d is even and $g^d=(g^{(d-1)/2})^2 \cdot g$ if d is odd.

The binary method extends easily to any radix m. Let $$H_i = \sum_{j=i}^{I-1} d_j m^{j-i}.$$

Since $$H_i = \left( \sum_{j=i+1}^{I-1} d_j m^{j-i} \right) + d_i = mH_{i+1} + d_i,$$

we get $$g^{H_i} = \begin{cases} (g^{H_{i+1}})^m & \text{if } d_i = 0 \\ (g^{H_{i+1}})^m \cdot g^{d_i} & \text{otherwise} \end{cases}$$

Noting that $g^d=g^{H_0}$, the previous relation gives rise to an exponentiation algorithm. It can be readily programmed by scanning the m-ary representation of d from left to right. As, at iteration i, for $I-2 \ge i \ge 0$, the method requires a multiplication by $g^{d_i}$ when $d_i \ne 0$, the values of $g^t$ with $1 \le t \le m-1$ are pre-computed and stored in (m-1) temporary variables; namely, $R[j] \leftarrow g^j$ for $1 \le j \le m-1$. If the successive values of $g^{H_i}$ are kept track of in an accumulator A, one gets, for $I-2 \ge i \ge 0$:

$$A \leftarrow \begin{cases} A^m & \text{if } d_i = 0 \\ A^m \cdot R[d_i] & \text{otherwise} \end{cases}$$

where A is initialized to $R[d_{I-1}]$. The algorithm is referred to as the (left-to-right) m-ary algorithm.

Right-to-Left Algorithms

A similar algorithm may be based on the right-to-left scan of exponent d. This may be useful when the m-ary length of d is unknown in advance. In the binary case, i.e. when m=2, the binary expansion of d is $$d = \sum_{i=0}^{I-1} d_i 2^i.$$

The algorithm makes use of the relation $$g^d = \prod_{\substack{0 \le i \le I-1 \\ d_i \ne 0}} g^{2^i}$$

for $d_i \ne 0$. An accumulator A is initialized to g and squared at each iteration, i.e. it contains $g^{2^i}$ at iteration i. Another accumulator, R[1], initialized to $1_G$, is multiplied with A if $d_i \ne 0$. Hence, at iteration I-1, if $d_i \ne 0$, accumulator R[1] contains the value of $$\prod_{\substack{0 \le i \le I-1 \\ d_i \ne 0}} g^{2^i} = g^d.$$

Although less known than its left-to-right counterpart, the algorithm can be extended to higher radixes. The basic idea remains the same. If $$d = \sum_{i=0}^{I-1} d_i m^i$$

denotes the m-ary expansion of d, it is possible to express it as:

$$g^d = \prod_{\substack{0 \le i \le I-1 \\ d_i=1}} g^{m^i} \cdot \prod_{\substack{0 \le i \le I-1 \\ d_i=2}} g^{2m^i} \cdots \prod_{\substack{0 \le i \le I-1 \\ d_i=m-1}} g^{(m-1)m^i} = \prod_{j=1}^{m-1} (L_j)^j,$$

where $L_j = \prod_{\substack{0 \le i \le I-1 \\ d_i=j}} g^{m^i}$ for $d_i = j$.

Hence, using (m−1) accumulators, R[1] ... R[m−1], to keep track of the values of $L_j$, $1 \le m-1$, and an accumulator A that stores the successive values $g^{m^i}$ at iteration i, the accumulators are updated, for $1 \le i \le I-1$, as $$\begin{cases} R[d_i] \leftarrow R[d_i] \cdot A & \text{if } d_i \neq 0 \\ A \leftarrow A^m & \text{otherwise} \end{cases}$$

where A is initialized to g and R[1] ... R[m−1] are initialized to $1_G$. It can be seen that $g^d$ is then given by $$A \leftarrow \prod_{j=1}^{m-1} R[j]^j.$$

The obtained algorithm is referred to as the right-to-left m-ary algorithm.

It will however be appreciated that an exponentiation algorithm that is not properly implemented may be vulnerable to different kinds of attacks, such as side-channel attacks and fault attacks. Simple Power Analysis (SPA) attacks and safe-error attacks are particularly relevant for exponentiation algorithms.

By observing a suitable side channel, such as the power consumption or electromagnetic emanations, an attacker may recover secret information. For exponentiation-based cryptosystems, the goal of the attacker is to recover the value of exponent d (or a part thereof) used in the computation of $g^d$. SPA-type attacks assume that the attacker infers secret information—typically one or several bits of d—from a single execution of $g^d$.

This may be exemplified by the square-and-multiply algorithm, i.e. a left-to-right algorithm with m=2.

$$\text{Input: } g \in G, d = \sum_{i=0}^{l-1} d_i 2^i$$

Output: $g^d$
1. R[1]←g; A←$1_G$
2. for i=I−1 down to 0 do
3. A←$A^2$
4. if ($d_i \neq 0$) then A←A·R[1]
5. end
6. return A Each iteration comprises a 'square' and, when the bit exponent is non-zero, a subsequent 'multiply'. Since the algorithm behaves differently depending on the bit values of the exponent, this may be observed from a suitable side-channel. The information thus gleaned may enable the attacker to recover one or more bits of exponent d.

One way of preventing an attacker from recovering the bit values is to execute the same instructions regardless of the value of $d_i$. Such an algorithm is said to be 'regular' and there are several different implementations.

The test of whether a digit is non-zero in step 4 may be removed by replacing the step by A←A·R[$d_i$], where temporary variable R[0] is initialized to $1_G$. Alternatively, a fake multiply may be performed when $d_i$=0. Doing so, there will be no conditional branchings; each iteration comprises a square followed by a multiply. This is known as the 'square-and-multiply-always' algorithm. However, the resulting algorithm is vulnerable to safe-error attacks.

A regular exponentiation may also be obtained by recoding exponent d such that none of the digits are zero, but this supposes that the recoding algorithm itself is resistant against SPA-type attacks.

It will be appreciated that while the square-and-multiply algorithm was used as an example, the attacks mentioned apply to the m-ary exponentiation algorithms already described. While it may be argued that, for larger m, m-ary exponentiation algorithms are more regular and therefore more resistant against SPA-type attacks, these algorithms are not entirely regular, since two cases are to be distinguished: $d_i$=0 and $d_i \neq 0$.

A safe-error attack, already mentioned in passing, is made by inducing a fault during the execution of an instruction. An attacker may deduce that the instruction was fake if the final result is correct and, inversely, that the instruction was effective if the final result is incorrect. This knowledge may then be used to obtain a bit of the exponent d.

In the square-and-multiply-always algorithm, the attacker can induce a fault during a multiply. If the final result is correct, then the attacker may deduce that the corresponding exponent bit is a zero (i.e. fake multiply); otherwise, the attacker may deduce that the exponent bit is a one.

Safe-error attacks also apply similar higher-radix m-ary algorithms to distinguish digits equal to zero.

In the prior art, there are highly regular exponentiation algorithms whose characteristics are:
  they are regular, i.e. they always repeat the same instructions in the same order regardless of the input
  they do not insert any dummy operations.

Such highly regular algorithms protect against SPA-type attacks and safe-error attacks. Examples of such algorithms include the so-called Montgomery ladder and a more recent powering ladder.

The Montgomery ladder has been described by Marc Joye and Sung-Ming Yen in "The Montgomery Powering Ladder", in B. S. Kaliski Jr., Ç. K. Koç, and C. Paar, editors, Cryptographic Hardware and Embedded Systems—CHES 2002, volume 2523 of Lecture Notes in Computer Science, pages 291-302, Springer-Verlag, 2002.

$$\text{Input: } g \in G, d = \sum_{i=0}^{l-1} d_i 2^i$$

Output: $g^d$
1. R[0]←$1_G$; R[1]←g
2. for i=I−1 down to 0 do
3. R[1−$d_i$]←R[1−$d_i$]·R[$d_i$]
4. R[$d_i$]←R[$d_i$]$^2$
5. end
6. return R[0]

The more recent powering ladder was described by Marc Joye in "Highly Regular Right-to-Left Algorithms for Scalar Multiplication", in P. Paillier and I. Verbauwhede, editors, Cryptographic Hardware and Embedded Systems—CHES 2007, volume 4727 of Lecture Notes in Computer Science, pages 135-147, Springer-Verlag, 2007.

$$\text{Input: } g \in G, d = \sum_{i=0}^{I-1} d_i 2^i$$

Output: $g^d$
1. $R[0] \leftarrow 1_G; R[1] \leftarrow g$
2. for i=0 to I-1 do
3. $R[1-d] \leftarrow R[1-d_i]^2 \cdot R[d_i]$
4. end
5. return R[0]

As will be noticed, both algorithms rely on specific properties of the binary representation.

It can therefore be appreciated that there is a need for a solution that provides a highly regular algorithm that may be used for radixes higher than 2 or that offer other characteristics. This invention provides such a solution.

SUMMARY OF INVENTION

In a first aspect, the invention is directed to an exponentiation method. The method takes as input g in a multiplicatively written group G, and a I-digit exponent f with a radix m>1 and most significant digit $f_{I-1}>0$. The method outputs $z=g^f$. A device performs a m-ary exponentiation algorithm on input g and f, where one step of the m-ary exponentiation algorithm involves $f^*_{I-1}=f_{I-1}-1$ and at least one other step involves a non-zero digit $f^*_i$ in the set $\{m-1, \ldots, 2m-2\}$.

In a first preferred embodiment, $f^*_i$ is computed as $f^*_i=m-1+f_i$, where $f_i$ is in set $\{0, \ldots m-1\}$ and $f_{I-1} \ldots f_1 f_0$ the unique representation of f in base m.

In a second preferred embodiment, f is computed as d−1, d being a I-digit exponent with a radix m>1. It is advantageous that $y=g^d$ is evaluated as $z \cdot g$. The m-ary exponentiation algorithm may process the exponent from left to right or from right to left. It is further advantageous that m=2 and $d_{I-1}=0$; the extra-step involving $f^*_{I-1}$ may also be skipped In a second aspect, the invention is directed to an apparatus for performing an exponentiation method. The input is g in a multiplicatively written group G and a I-digit exponent f with a radix m>1 and most significant digit $f_{I-1}>0$; the output is $z=g^f$. The apparatus comprising a processor for performing a m-ary exponentiation algorithm on input g and f, wherein one step of the m-ary exponentiation algorithm involves $f^*_{I-1}=f_{I-1}-1$ and at least one other step involves a non-zero digit $f^*_i$ in the set $\{m-1, \ldots, 2m-2\}$ In a third aspect, the invention is directed to a computer program product having stored thereon instructions that, when executed by a processor, performs the method of any one of the embodiments of the first aspect.

BRIEF DESCRIPTION OF DRAWINGS

Preferred features of the present invention will now be described, by way of non-limiting example, with reference to the accompanying drawings, in which FIG. 1 illustrates an apparatus for performing a highly regular exponentiation algorithm according to a preferred embodiment of the invention.

DESCRIPTION OF EMBODIMENTS

The present invention is for highly regular exponentiation methods considering a representation d−1 rather than that of plain exponent d. The method is independent of the radix representation and of the scan direction—left-to-right or right-to-left.

As already mentioned, the goal of exponentiation is to evaluate $y=g^d$ given an element $g \in G$ and a I-digit exponent $$d = \sum_{i=0}^{I-1} d_i m^i.$$

The exponent d may be written $$d = (d_{I-1} - 1)m^{I-1} + \left(\sum_{i=0}^{I-2}(d_i + m - 1)m^i\right) + 1,$$

since $\sum_{i=0}^{I-2}(d_i + m - 1)m^i =$ $$\sum_{i=0}^{I-2} d_i m^i + \sum_{i=0}^{I-2}(m-1)m^i = (d - d_{I-1}m^{I-1}) + (m^{I-1} - 1).$$

This may in turn be written $$d - 1 = \sum_{i=0}^{I-1} d_i^* m^i,$$

where $d_i^*=d_i+m-1$ for $0 \leq i \leq I-2$, and $d_i^*=d_{I-1}-1$ for i=I−1.

Left-to-Right Algorithm

If d>0, it follows that $d_{I-1} \geq 1$, and so $d_{I-1}^* \geq 0$. All the subsequent digits are non-zero, i.e. $d_i^*>0$ for $i \leq I-2$. It is therefore possible to devise a regular method to get the value of $g^{d-1}$ for some d>0. The value of $y=g^d$ can then be obtained as $y=g^{d-1} \cdot g$.

The algorithm makes use of an accumulator A, which is initialized to $g^{d_{I-1}^*}$. At each iteration of the main loop, accumulator A is raised to the power m and then always multiplied by $g^{d_i^*}$ (as $d_i^* \neq 0$). As $d_i^* \in \{1, \ldots, m\}$, the values of $g^1, \ldots, g^m$ may be pre-computed and stored in temporary variables $R[1], \ldots, R[m]$. After the main loop, the accumulator A is multiplied by g to obtain the correct result.

$$\text{Input: } g \in G, d = \sum_{i=0}^{I-1} d_i m^i, d > 0$$

Output: $g^d$
Pre-Computation and Initialization
1. for i=1 to m do $R[i] \leftarrow g^{m+i-2}$
2. $A \leftarrow g^{d_{I-1}-1}$
Main Loop
3. for i=I−2 down to 0 do
4. $A \leftarrow A^m \cdot R[1+d_i]$
5. end
Correction
6. $A \leftarrow A \cdot g$
7. return A During the pre-computation and initialization, accumulator A is initialized to $g^{d_{I-1}^*}$, with $d_{I-1}^*=(d_{I-1}-1)$ in $\{0, \ldots, m-2\}$, in a regular manner. Moreover, as the values of $g^{m-1}, \ldots, g^{2m-2}$ are computed and stored in registers $R[1], \ldots, R[m-1]$ before the main loop and $d_{I-1} \in \{1, \ldots, m-1\}$, it is possible to:

a) write $g^{j-1}$ in R[j] for $1 \leq j \leq m$,
b) assign A to the corresponding register so that it contains $g^{d_{I-1}-1}$, i.e. by setting $A \leftarrow R[d_{I-1}]$, and
c) multiply registers $R[1], \ldots, R[m]$ by $g^{m-1}$ so that they respectively contain $g^{m-1}, \ldots, g^{2m-2}$.

The evaluation of $g^{d_{I-1}-1}$ is then regular. The algorithm may then be written as follows:

$$\text{Input: } g \in G, d = \sum_{i=0}^{I-1} d_i m^i, d > 0$$

Output: $g^d$
Pre-Computation and Initialization
1. $R[1] \leftarrow 1_G$; $R[2] \leftarrow g$; for i=3 to m do $R[i] \leftarrow R[i-1] \cdot R[2]$
2. $A \leftarrow R[d_{I-1}]$; for i=1 to m do $R[i] \leftarrow R[i] \cdot R[m]$
Main Loop
3. for i=I−2 down to 0 do
4. $A \leftarrow A^m \cdot R[1+d_i]$
5. end
Correction
6. $A \leftarrow A \cdot g$
7. return A Another way of obtaining a regular evaluation is to force the leading digit to a predetermined value by adding to d a suitable multiple of the order g prior to the exponentiation.

In addition, the correction can be avoided by replacing d with d+1 prior to the exponentiation, i.e. d←d+1. This may be useful when the memory is scarce and the value g is not available in memory. It will be noted that this step may be combined with the addition of a multiple of the order g.

Right-to-Left Algorithm

It is also possible to devise a right-to-left m-ary exponentiation algorithm. Starting from $$d - 1 = \sum_{i=0}^{I-1} d_i^* m^i,$$

where $d_i^* = d_i + m - 1$ for $0 \le i \le I-2$, and $d_i^* = d_{I-1}$ for $i = I-1$, it is possible to write $$g^{d-1} = (g^{m^{I-1}})^{d_{I-1}^*} \cdot \prod_{j=1}^{m-1} (L_j^*)^{m+j-2}, \text{ where } L_j^* = \prod_{0 \le i \le I-2} g^{m^i} \text{ for } d_i^* = j.$$

The algorithm makes use of m accumulators $R[1], \ldots, R[m]$ to store the values of $L_j^*$, $1 \le j \le m$ and an accumulator A that stores the successive values of $g^{m^i}$. Accumulators $R[1], \ldots, R[m]$ are initialized to $1_G$ and accumulator A is initialized to g. Again it is to be noted that all digits $d_i^*$ are non-zero, i.e. $d_i^* \in \{m-1, \ldots, 2m-2\}$ for $0 \le i \le 2$. As a consequence, at each iteration i, an accumulator R[j] is updated ($R[d_i^*] \leftarrow R[d_i^*] \cdot A$) and accumulator A is updated as $A \leftarrow A^m$. Hence, the evaluation of $L_j^*$ is regular. It then remains to evaluate the above relation in a regular manner to obtain a regular right-to-left m-ary exponentiation algorithm to get $g^{d-1}$ and thus $y = g^d$ as $g^{d-1} \cdot g$.

$$\text{Input: } g \in G, d = \sum_{i=0}^{I-1} d_i m^i, d > 0$$

Output: $g^d$
Initialization
1. for i=1 to m do $R[i] \leftarrow 1_G$
Main Loop
2. $A \leftarrow g$
3. for i=0 to I−2 do
4. $R[1+d_i] \leftarrow R[1+d_i] \cdot A$
5. $A \leftarrow A^m$
6. end
Aggregation $$7. \ A \leftarrow A^{d_{I-1}-1} \cdot \prod_{i=1}^{m} R[i]^{m+i-2}$$

Correction
8. $A \leftarrow A \cdot g$
9. return A

In certain groups, neutral element $1_G$ requires special treatment. In such groups, the multiplication between two elements B and C is typically implemented by checking whether B or C is $1_G$. If this is the case, then the other element is returned; if not, the 'regular' multiplication B·C is evaluated and returned. As this may be observed through SPA, this may leak the first occurrence of a digit in $\{0, \ldots, m-1\}$ in the m-ary representation of d.

One way to prevent this leakage is to initialize $R[1], \ldots, R[m]$ to values different from $1_G$. As an example, $R[1], \ldots, R[m]$ are initialized to g. Since each R[i] is raised to the power (m+i−2) during the aggregation, $$\sum_{i=1}^{m} (m+i-2) = \frac{3m(m-1)}{2}$$

is subtracted from d prior to the exponentiation.

In the algorithm, this corresponds to replacing step 1 with
1a. for i=1 to m do $R[i] \leftarrow g$
1b. $d \leftarrow d - 3m(m-1)/2$ If done naively, aggregation step 7 can be expensive. Donald E. Knuth provides a technique on page 634 of The Art of Computer Programming, volume 2/Seminumerical Algorithms; Addison-Wesley, 2nd edition, 1981, which may be extended to suit the present needs. An accumulator A is initialized to R[m]. Setting $A \leftarrow A \cdot R[i]$ and $R[i] \leftarrow R[i] \cdot R[i+1]$ for i=m−1, . . . , 1 gives $$R[1] \leftarrow \prod_{1 \le i \le m} R[i] \text{ and } A \leftarrow \prod_{i=1}^{m} R[i]^i.$$

Therefore, writing $$\prod_{i=1}^{m} R[i]^{m+i-2} \text{ as } \prod_{i=1}^{m} R[i]^i \cdot \prod_{i=1}^{m} R[i]^{m-2}$$

enables use of Knuth's technique to express it as $A \cdot R[1]^{m-2}$. In the algorithm, accumulator A is initialized to $A^{d_{I-1}-1} \cdot R[m]$ to get the value of $g^{d-1}$.

Aggregation step 7 may thus be changed to

7a. $A \leftarrow A^{d_{I-1}-1}$; $A \leftarrow A \cdot R[m]$
7b. for i=m−1 down to 1 do
7c. $R[i] \leftarrow R[i] \cdot R[i+1]$; $A \leftarrow A \cdot R[i]$
7d. end
7e. $A \leftarrow A \cdot R[1]^{m-2}$ The initialization of accumulator A should be performed in a regular manner. An easy way of doing this is to add to d a suitable multiple of the order of g in order to force the leading digit of the resulting d to a predetermined value.

As for the left-to-right version, the correction may be avoided by replacing d with d+1. Again, this step may be combined with other steps, including the initialization step when neutral elements need special treatment, or the initialization of accumulator A in the aggregation step to force the leading digit.

These m-ary algorithms come in numerous variants. As further examples, they will now be shown tailored for the binary case, i.e. m=2. In this case, provided that d>0, $d_{I-1}=1$, this gives $$d - 1 = \sum_{i=0}^{I-2} d_i^* 2^i, \text{ with } d_i^* = d_i + 1$$

Binary Left-to-Right Algorithm $$\text{Input: } g \in G, d = \sum_{i=0}^{I-1} d_i 2^i, d > 1$$

Output: $g^d$
1. $R[1] \leftarrow g$; $R[2] \leftarrow R[1]^2$
2. $A \leftarrow R[1+d_{I-2}]$
Main Loop
3. for i=I−3 down to 0 do
4. $A \leftarrow A^2 \cdot R[1+d]$
5. end
Correction
6. $A \leftarrow A \cdot R[1]$
7. return A As an alternative, assuming that d>1 (i.e. I≥2), accumulator A may be initialized to $g^{d^*_{I-2}}$ and the loop may be started at index I−3, which means that the neutral element $1_G$ does not have to be dealt with.

Binary Right-to-Left Algorithm $$\text{Input: } g \in G, d = \sum_{i=0}^{I-1} d_i 2^i, d > 1$$

Output: $g^d$
1. $R[1] \leftarrow g^{d_0}$; $R[2] \leftarrow g$
2. $A \leftarrow R[2]$
3. for i=1 to I−2 do
4. $A \leftarrow A^2$
5. $R[1+d_i] \, R[1+d_i] \cdot A$
6. end
7. $A \leftarrow R[1] \cdot R[2]^2$
8. return A It will be noted that the order of the squaring and the multiplication has been changed, and that the loop starts at index 1.

In some cases, exponent d is known to be odd; this is for example the case in RSA. If so, R[1] can be initialized to g. When the least significant bit of d is arbitrary, R[1] and R[2] can be initialized as $R[1] \leftarrow 1_G$; $R[2] \leftarrow g$; $R[1] \leftarrow R[1] \cdot R[1+d_0]$. Another strategy, provided that the order of g is odd, is to add a suitable multiple thereof to force the parity of d.

Two specific examples will now be given: ternary left-to-right and binary right-to-left.

Ternary Left-to-Right Example:
m=3; d=$(120)_3$=15; I=3
1. $R[1] \leftarrow 1$; $R[2] \leftarrow g$; for i=3 to m do $R[i] \leftarrow R[i-1] \cdot R[2] \rightarrow R[3] \leftarrow R[2] \cdot R[2] = g^2$
2. $A \leftarrow R[d_{I-1}] = R[d_2] = R[1] = 1$; for i=1 to m do $R[i] \leftarrow R[i] \cdot R[m] = R[i] \cdot R[3] \rightarrow$ i=1: $R[1] \leftarrow R[1] \cdot R[3] = 1 \cdot g^2 = g^2$; i=2: $R[2] \leftarrow R[2] \cdot R[3] = g \cdot g^2 = g^3$; i=3: $R[3] \leftarrow R[3] \cdot R[3] = g^2 \cdot g^2 = g^4$
Main Loop
3. for i=I−2 down to 0 do→for i=3−2=1 down to 0 do
4. $A \leftarrow A^m \cdot R[1+d_i]$; i=1: $A \leftarrow A^3 \cdot R[1+d_1] = 1^3 \cdot R[1+2] = R[3] = g^4$;
i=0: $A \leftarrow A^3 \cdot R[1+d_0] = (g^4)^3 \cdot R[1+0] = g^{12} \cdot R[1] = g^{12} \cdot g^2 = g^{14}$;
5. end
Correction
6. $A \leftarrow A \cdot g \rightarrow A \leftarrow g^{14} \cdot g = g^{15}$
7. return A Since d=15, the algorithm gives the expected result.

Binary Right-to-Left Example:
m=2; d=$(1101)_2$=13 [$d_3$=1, $d_2$=1, $d_1$=0, $d_0$=1]; I=4
1. $R[1] \leftarrow g^{d_0} = g$; $R[2] \leftarrow g$
2. $A \leftarrow R[2] = g$
3. for i=1 to I−2 do→for i=1 to 2 do
4. $A \leftarrow A^2$
5. $R[1+d_i] \, R[1+d_i] \cdot A$
i=1: $A \leftarrow A^2 = g^2$, $R[1+d_1] = R[1] \leftarrow R[1] \cdot A = g \cdot g^2 = g^3$
i=2: $A \leftarrow A^2 = (g^2)^2 = g^4$, $R[1+d_2] = R[2] \leftarrow R[2] \cdot A = g \cdot g^4 = g^5$
6. end
7. $A \leftarrow R[1] \cdot R[2]^2 \rightarrow A \leftarrow g^3 \cdot (g^5)^2 = g^3 \cdot g^{10} = g^{13}$
8. return A Once again, since d=13, the algorithm gives the expected result.

FIG. 1 illustrates a device according to a preferred embodiment of the present invention. The device 100 comprises at least one interface unit 110 adapted for communication with other devices (not shown), at least one processor 120 and at least one memory 130 adapted for storing data, such as accumulators and intermediary calculation results. The processor 120 is adapted to calculate an exponentiation according to any of the embodiments of the inventive methods, as previously described herein. A computer program product 140 such as a CD-ROM or a DVD comprises stored instructions that, when executed by the processor 120, performs the method according to any of the embodiments of the invention.

It will be appreciated that the present exponentiation methods provides a solution to the problem of constructing a higher-radix Montgomery-like exponentiation ladder. The methods of the invention can enjoy the same useful properties as the Montgomery ladder, i.e. protection against SPA-type attacks and safe-error attacks. In addition, as the methods are available for any radix m and scan direction, they offer better performance and greater flexibility.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A processor-implemented attack-resistant cryptographic exponentiation method taking as input g in a multiplicatively written group G and a I-digit exponent f with a radix m>1 and most significant digit $f_{I-1}>0$ and outputs $z=g^f$, the method being performed in a processor and through
   a m-ary exponentiation algorithm being performed by the processor on input g and f wherein
   one step of the m-ary exponentiation algorithm uses a new most significant digit $f^*_{I-1}=f_{I-1}-1$ and at least one other step uses a non-zero digit $f^*_i$ in the set $\{m-1, \ldots, 2m-2\}$, wherein i is the index of the non-zero digit.

2. The exponentiation method of claim 1 wherein $f^*_i$ is computed as $f^*_i=m-1+f_i$ where $f_i$ is in set $\{0, \ldots m-1\}$ and $f_{I-1} \ldots f_1 f_0$ the unique representation of f in base m.

3. The exponentiation method of claim 1, where f is computed as d−1, d being a I-digit exponent with a radix m>1.

4. The exponentiation method of claim 3, further comprising the step of evaluating $y=g^d$ as $z \cdot g$.

5. The exponentiation method of claim 3, wherein the m-ary exponentiation algorithm processes the exponent from left to right.

6. The exponentiation method of claim 3, wherein the m-ary exponentiation algorithm processes the exponent from right to left.

7. The exponentiation method of claim 5, wherein m=2 and $d_{I-1}^*=0$.

8. The exponentiation method of claim 7, wherein the extra-step involving $f^*_{I-1}$ is skipped.

9. An apparatus for performing an attack-resistant cryptographic exponentiation method taking as input g in a multiplicatively written group G and a I-digit exponent f with a radix m>1 and most significant digit $f_{I-1}>0$ and outputs $z=g^f$, the apparatus comprising a processor for performing a m-ary exponentiation algorithm on input g and f, wherein one step of the m-ary exponentiation algorithm uses a new most significant digit $f^*_{I-1}=f_{I-1}-1$ and at least one other step uses a non-zero digit $f^*_i$ in the set $\{m-1, \ldots, 2m-2\}$, wherein i is the index of the non-zero digit.

10. A non-transitory computer-readable storage medium having stored thereon instructions that, when executed by a processor, performs the method of claim 1.

* * * * *